Jan. 15, 1924.

K. P. HANGL

VEHICLE WHEEL

Filed June 19, 1922

WITNESSES

INVENTOR
Karl P. Hangl
BY
ATTORNEYS

Jan. 15, 1924.  
K. P. HANGL  
VEHICLE WHEEL  
Filed June 19, 1922  
1,481,200  
2 Sheets-Sheet 2
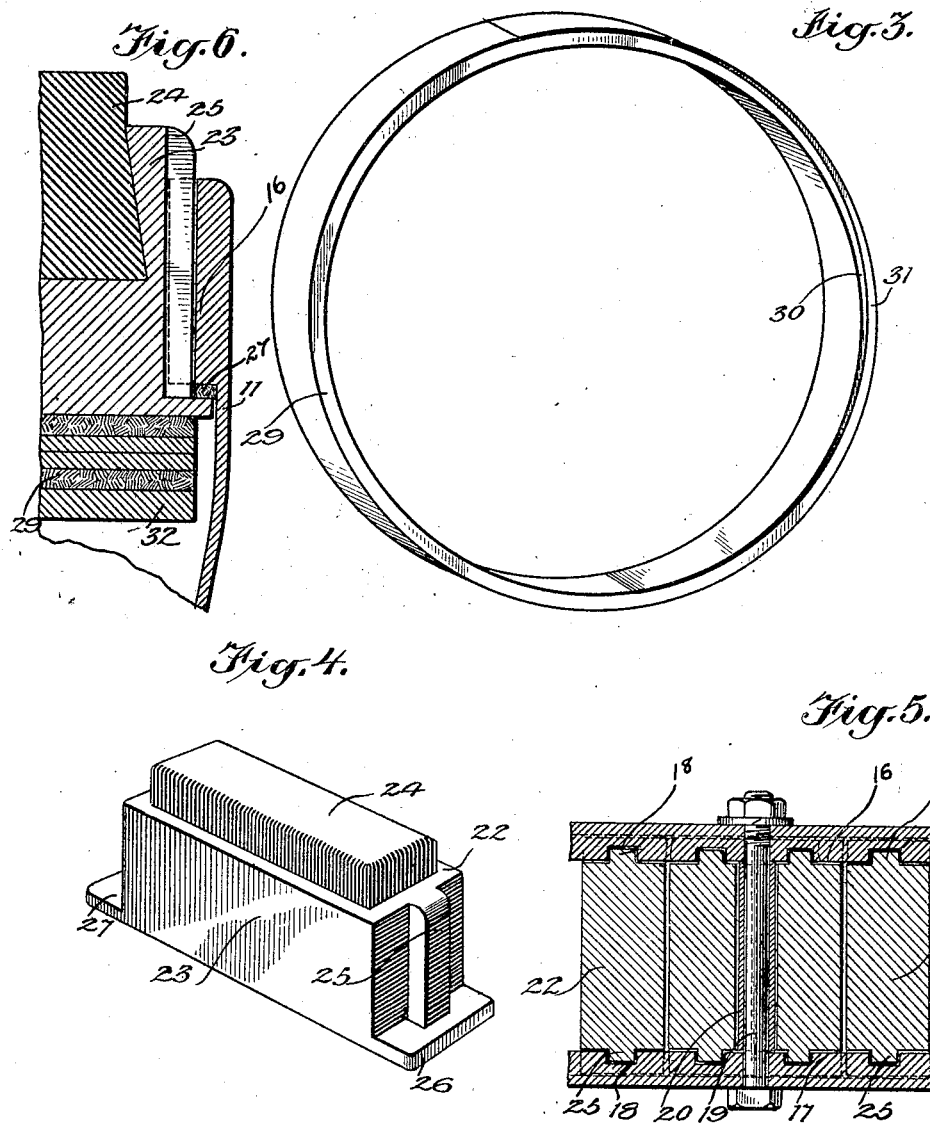
WITNESSES  
INVENTOR  
Karl P. Hangl  
BY  
ATTORNEYS Patented Jan. 15, 1924.

1,481,200

UNITED STATES PATENT OFFICE.

KARL P. HANGL, OF NEW YORK, N. Y.

VEHICLE WHEEL.

Application filed June 19, 1922. Serial No. 569,517.

*To all whom it may concern:*

Be it known that I, KARL P. HANGL, a citizen of the United States, and a resident of the city of New York, borough of the Bronx, in the county of Bronx and State of New York, have invented new and useful Improvements in Vehicle Wheels, of which the following is a full, clear, and exact description.

This invention relates to vehicle wheels and was primarily designed for use with motor vehicles.

Since the introduction of motor vehicles a great number of different types of resilient wheels have been devised. For many years the inflated tire has been most generally used. The inflated tire has been very serviceable, but even admitting this, it has a number of defects which it is desirable to overcome. The solid resilient tires which have been introduced have not become generally used except for trucks and the like.

The general object of this invention is the provision of a cheap, simple, efficient and durable vehicle wheel that gives the necessary resiliency.

A further object of the invention is the provision of a vehicle wheel that may be easily repaired in case of damage.

These objects are accomplished by providing a wheel frame having radial grooves spaced at intervals about its periphery, shock blocks slidably mounted in the radial grooves, and resilient means for retaining the shock blocks in position and giving resiliency to the wheel.

These and other objects of the invention will be more clearly understood from the following detailed description and accompanying drawings.

Figure 3 is a perspective view of one of the resilient split rings;

Figure 4 is a perspective view of a shock block;

Figure 5 is a section along the line 5—5, Figure 1;

Figure 6 is a cross section showing the construction of the wheel.

Figure 1:
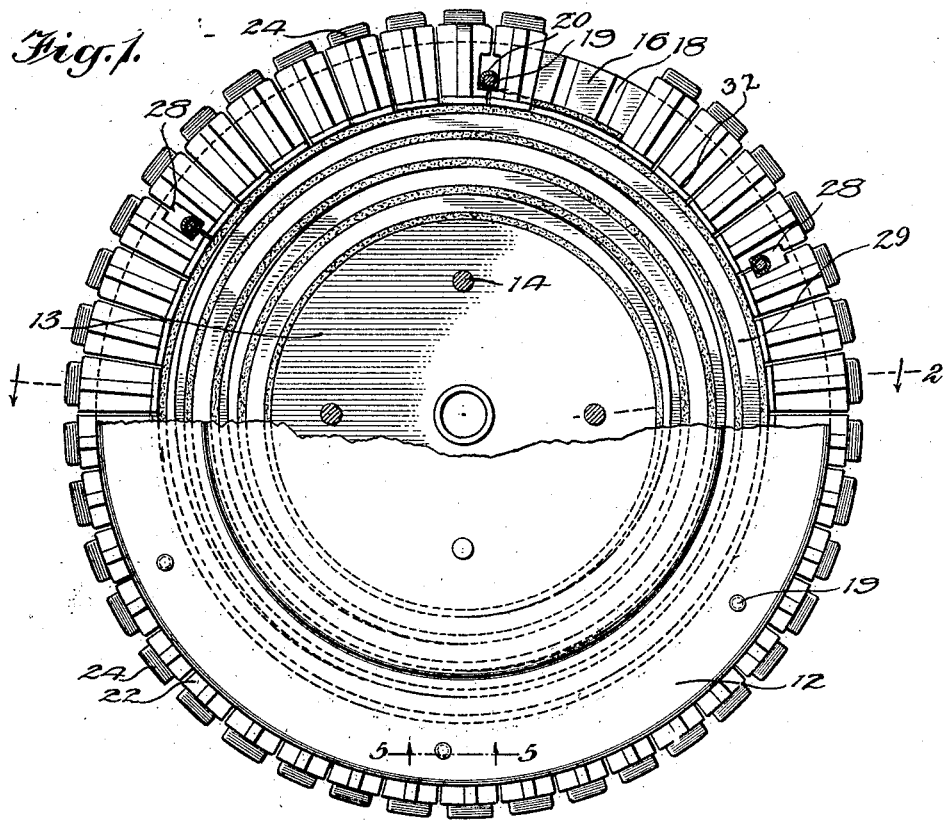
Figure 1 is a side elevation of the vehicle wheel with a portion broken away to show its construction.
Figure 2:
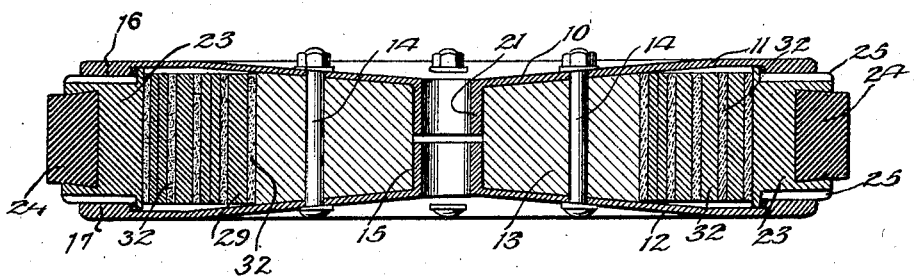
Figure 2 is a section along the line 2—2, Figure 1.

Referring to the above mentioned drawings, a wheel frame assemblage 10 is built up of two plate-shaped disks 11 and 12 mounted on a spacing member 13. These disks 11 and 12 are retained in position on the spacing member by means of bolts 14 which extend through the latter. Integral with the disks 11 and 12 are two hub sections 21 and 15, respectively, which form a hub when the disks are clamped in position on the spacing member 13. Formed on the disks 11 and 12 are annular rings 16 and 17, respectively. In these rings a plurality of radial grooves 18 are provided at intervals. A plurality of bolts 19 extend through the plates 11 and 12 near their outer edges, serving to strengthen the frame. Sleeves 20 are positioned on these bolts and serve as spacing members.

Shock blocks or tread members 22 are built up from mortised blocks 23 and an elastic block 24 which is set in the mortised block 23. This elastic block 24 may be made from hard rubber or some other suitable composition. Integral with each end of the block 23 is a vertical guide 25 adapted to fit into the grooves 18. Extending across the inner edges of the ends of the block 23 and at right angles to the guides 25 are flanges 26. Positioned on top of the flanges 26 are annular pads 27 made from felt or some other material that does not give rise to a sound when brought suddenly into contact with metal. The shock blocks 22 are positioned between the plates 11 and 12, the guides 25 fitting into the grooves 18 formed in the annular rings 16 and 17, the flanges 26 provided with the pads 27 engaging the inner edges of the annular rings. Certain of the shock blocks have notches 28 cut in the sides so as to fit over the sleeves 20 mounted on the bolts 19 to allow for the movement of the shock blocks along radial lines.

A plurality of resilient split rings 29 having ends 30 and 31 wedge-shaped and overlapping are provided. These resilient rings are mounted on the spacing member 13 and spaced from one another by means of packing rings 32. In this particular case four such rings are provided, the outer one engaging the shock blocks 22 and serving to hold them in their positions when the pads 27 are in engagement with the annular rings 16 and 17. Any number of these resilient split rings might be provided, depending on the resiliency required and the strength of the rings. The packing rings 32 which are provided for spacing the resilient split rings 29 from one another may be saturated with any lubricant, which serves not only to prolong the life of the packing rings but to lubricate the split rings so that the reciprocating movements of the ends 30 and 31 do not cause excessive wear or give rise to a heated condition.

The above description sets forth in detail a vehicle wheel of simple construction which is durable and easy to repair. Further, the wheel is comparatively noiseless since means have been provided for preventing the striking of the metal parts.

I would state in conclusion that while the illustrated example constitutes a practical embodiment of my invention, I do not limit myself strictly to the exact details herein illustrated since manifestly the same can be considerably varied without departing from the spirit of the invention as defined in the appended claims.

Claims:

1. In a vehicle wheel including a wheel casing, a plurality of split rings mounted in the wheel casing, packing and lubricating means interposed between the split rings, and a plurality of shock blocks slidably mounted in the casing and seated on the split rings, transmitting impulses received directly to the split rings.

2. In a vehicle wheel including a wheel casing, a plurality of split rings mounted in the wheel casing, packing and lubricating means interposed between the split rings, a plurality of rigid members for carrying tread members slidably mounted in the casing and seating on the split rings, and a plurality of tread members carried by said rigid members.

3. In a vehicle wheel including a plurality of shock blocks, a plurality of overlapping resilient rings carrying the shock blocks and giving resiliency to the wheel, and packing and lubricating means interposed between the rings.

4. In a vehicle wheel of the character described including a tread, a plurality of split rings directly carrying the tread and giving resilience to the wheel, and packing and lubricating means interposed between the split rings for eliminating noise and lubricating the moving parts.

5. A vehicle wheel of the class described comprising a wheel frame including two disks and a spacing member for said disks, means for attaching the disks together and mounting them on said spacing member, shock blocks slidably mounted between said disks, forming a wheel tread said shock blocks being slidable along radial lines, resilient split rings mounted in said wheel frame, serving to hold the shock blocks in position, and spacing means interposed between said split rings.

6. A vehicle wheel of the class described, comprising a pair of disks, a spacing member for mounting between said disks, and means for clamping said disks on said spacing member, means in conjunction with the disks for forming a hub when said disks are clamped in position on said spacing member, shock blocks mounted to slide along radial lines between said disks, means for limiting the outward movement of said shock blocks, a plurality of resilient split rings mounted between said disks to retain said shock blocks in their outward positions to form a wheel tread, and noise absorbing and lubricating means mounted between the split rings.

7. A vehicle wheel of the class described comprising a wheel frame, shock blocks slidably mounted in the wheel frame, means for limiting the outward movement of the shock blocks, and means interposed between said limiting means and the shock blocks for preventing noise on the movements of the shock blocks, a plurality of resilient split rings mounted in the frame for retaining the shock blocks in their outer positions to form a wheel tread and to give resiliency to the wheel, and packing interposed between said rings to prevent sound and to hold lubricating material.

8. A vehicle wheel comprising a frame having radial grooves formed therein, shock blocks slidably mounted in the grooves, means for limiting the outward movement of said shock blocks, overlapping resilient split rings mounted in the frame carrying the shock blocks, said resilient split rings serving to normally retain the shock blocks in engagement with the means for limiting their outward movement, and packing and lubricating means interposed between the rings.

9. In a vehicle wheel of the class described, a frame having radial grooves spaced around its periphery, shock blocks slidably mounted in said radial grooves, means for limiting the outward movement of said shock blocks, means associated with said limiting means for eliminating noise, and a plurality of spaced resilient split rings carrying the shock blocks, said rings serving to retain the shock blocks in engagement with the means for limiting their outward movement and for giving resiliency to the wheel.

10. A vehicle wheel of the character described, comprising two disks having a plurality of radial grooves formed in their inner faces and spaced apart around their periphery, a spacing member mounted between said disks to form a wheel frame, a plurality of resilient split rings mounted on the spacing member and located between the disks, said rings being separated by noise eliminating members carrying a lubricant, a plurality of shock blocks forming a tread slidably mounted in the grooves in the disk and carried by the resilient split rings, and means for limiting the outward movement of the shock blocks provided with means for eliminating chatter as the shock blocks engage the means for limiting their outer movement.

KARL. P. HANGL.